(12) United States Patent
Anderson

(10) Patent No.: US 6,499,016 B1
(45) Date of Patent: Dec. 24, 2002

(54) AUTOMATICALLY STORING AND PRESENTING DIGITAL IMAGES USING A SPEECH-BASED COMMAND LANGUAGE

(75) Inventor: Eric C. Anderson, San Jose, CA (US)

(73) Assignee: Flashpoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/514,230

(22) Filed: Feb. 28, 2000

(51) Int. Cl.[7] ............................................. G10L 15/22
(52) U.S. Cl. ......................................... 704/275; 704/235
(58) Field of Search ................................. 704/270, 272, 704/275, 251, 231, 235, 200

(56) References Cited

U.S. PATENT DOCUMENTS

| | | |
|---|---|---|
| 5,633,678 A | 5/1997 | Parulski et al. |
| 5,940,121 A | 8/1999 | Mcintyre et al. |
| 6,101,338 A * | 8/2000 | Bernardi et al. ............ 396/287 |
| 6,324,545 B1 * | 11/2001 | Morag ......................... 358/408 |

* cited by examiner

Primary Examiner—Richemond Dorvil
(74) Attorney, Agent, or Firm—Sawyer Law Group LLP

(57) ABSTRACT

A method for automatically storing and presenting digital images is disclosed. The method includes capturing digital images with a digital camera and storing the images in an image file, where the file includes at least one speech field and at least one text-based tag. A categorization process is then initiated whereby a user speaks at least one category voice annotation into the digital camera to categorize an image, and the category voice annotation is stored in the speech field of the corresponding image file. The category voice annotation is then translated into at a text annotation using voice recognition, and the image and the text annotation are automatically stored in a database. An album may then be dynamically created by retrieving selected images and corresponding text annotations from the database in response to a request from the user, and displaying each image on the album along with the text annotations.

36 Claims, 4 Drawing Sheets

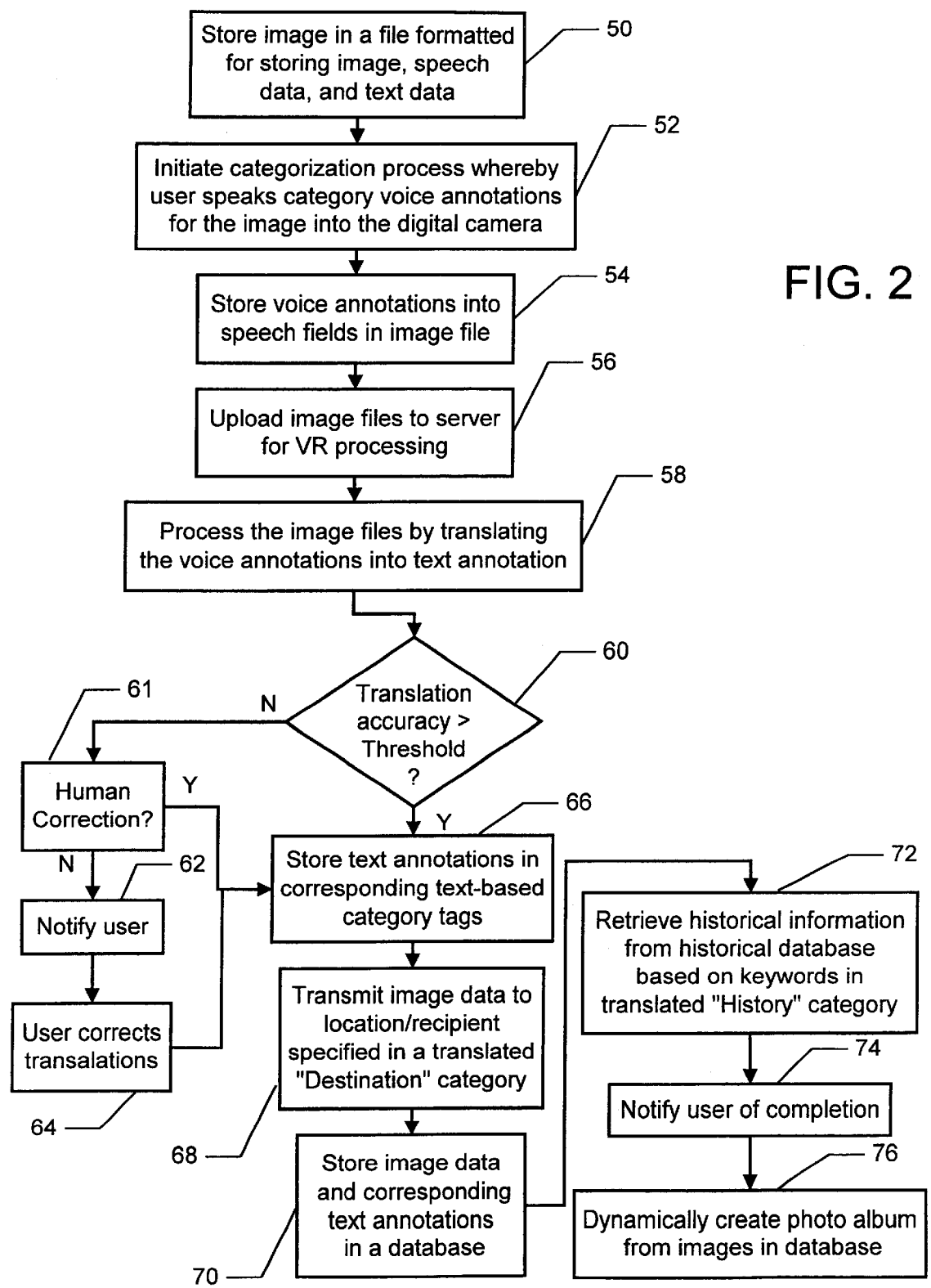

Voice Annotation

AUTOMATICALLY STORING AND PRESENTING DIGITAL IMAGES USING A SPEECH-BASED COMMAND LANGUAGE

FIELD OF THE INVENTION

The present invention relates to digital images, and more particularly to a method and system for automatically categorizing, storing, and presenting the images using a speech-based command language on a web server and a digital camera.

BACKGROUND OF THE INVENTION

As digital photography and the digitization of old photographs become more and more prevalent, the number of digital images that are stored and archived will increase dramatically. Whether the digital images are stored locally on a user's PC or uploaded and stored on a Web photo-hosting site, the number of images will make it increasingly difficult for a user to find desired images.

To alleviate this problem, some digital cameras allow a user to categorize images according to a single subject category, such that when the images are downloaded to a host computer, the images having the same category are stored in the same file folder (U.S. Pat. No. 5,633,678-Electronic Still Camera For Capturing And Categorizing Images).

Although categorizing images with a single subject matter category is useful for very high-level sorting, for searching a large number of images and for more powerful searching, multiple categories are required. However, selecting and/or entering information for multiple categories on a digital camera would be cumbersome and tedious for the user.

One solution is to first upload the images from the digital camera to a PC, and then categorize the images on the PC using an image management application, such as PhotoSee Pro by ACD Systems, for example. Such image management applications typically display thumbnail images and allow the user to enter properties, such as caption, date, photographer, description, and keywords, for each thumbnail image. The user may then search the entire photo collection by entering desired properties.

Although programs such as PhotoSee Pro, and image database programs in general, allow the categorization of images using multiple categories, these programs have major drawbacks. One problem is that when categorizing the images, the user must retype the category information for each image. When categorizing a large amount of images, manually entering category information for each image is extremely tedious and time-consuming.

Another problem with uploading the images to a PC and categorizing the images on the PC is that the user must remember all the pertinent information for each image, which may not be an easy task, especially if a significant amount of time has past between capturing the images and categorizing them. A further problem is that all the category information entered for a series of images is generally only used for indexing. That is, it may be difficult for the user to view the category information when the images are presented for viewing and/or printing.

Accordingly, what is needed is an improved method for automatically categorizing, storing, and presenting digital images. The present invention addresses such a need.

SUMMARY OF THE INVENTION

The present invention provides a method for automatically storing and presenting digital images is disclosed. The method includes capturing digital images with a digital camera and storing the images in an image file, where the file includes at least one speech field and at least one text-based tag. A categorization process is then initiated whereby a user speaks at least one category voice annotation into the digital camera to categorize an image, and the category voice annotation is stored in the speech field of the corresponding image file. The category voice annotation is then translated into at a text annotation using voice recognition, and the image and the text annotation are automatically stored in a database. An album may then be dynamically created by retrieving selected images and corresponding text annotations from the database in response to a request from the user, and displaying each image on the album along with the text annotations.

According to the system and method disclosed herein, the present invention allows a user to categorize images at the time of capture with multiple categories of information by merely speaking into the camera. And since the user's voice annotations are automatically recognized, translated, and stored in a database, the need for the user to manually enter categorization information is eliminated.

BRIEF DESCRIPTION OF THE DRAWINGS

FIG. 2 is a flow chart illustrating the process of automatically categorizing and storing digital images on a computer using a speech-based command language in a digital camera.

DETAILED DESCRIPTION

The present invention relates to categorizing, storing and presenting digital images. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
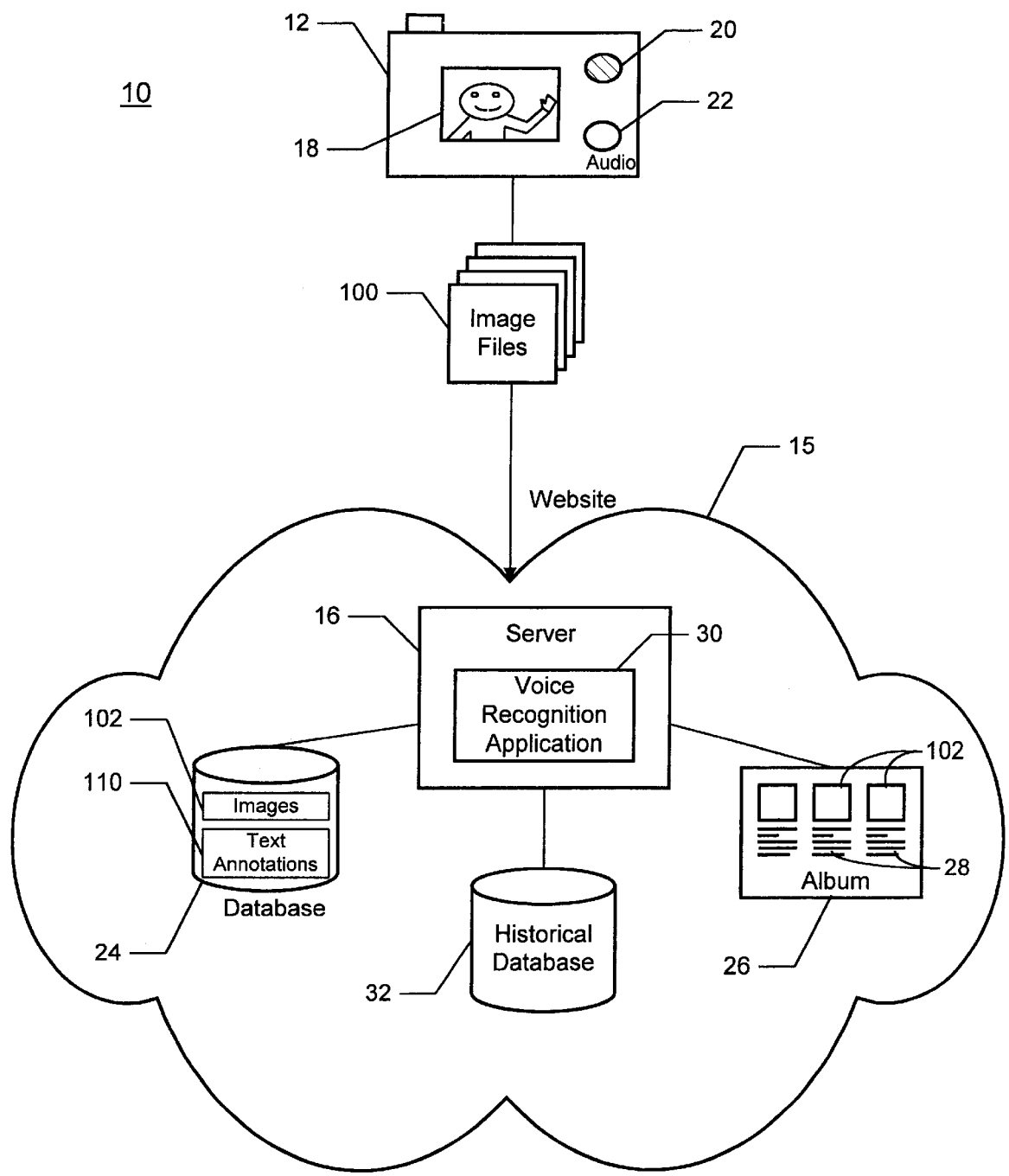
FIG. 1 is a block diagram illustrating a system for automatically categorizing, storing, and presenting digital images in accordance with a preferred embodiment of the present invention.

FIG. 1 is a block diagram illustrating a system for automatically categorizing, storing, and presenting digital images in accordance with a preferred embodiment of the present invention. The system 10 includes a digital camera 12 for capturing digital images 14 and a website 15 for storing and presenting the images. The digital camera 12 includes an LCD screen 18 for displaying captured images, and a microphone 20 and audio button 22 for recording sound. After capturing a series of images, a user may upload files 100 containing the images to the website 15. The website 15 includes a web server 16 equipped with a voice recognition application 30, and a database 24 in which the images 100 are stored. The present invention provides the user with an automated method for storing the images on the website and for having the images categorized.

By contrast, categorizing images in a conventional system would require the user to load the images on a computer, such as a PC, and use an image management application to enter the category information. Not only is the user forced to remember all the categorization information for each image because categorization takes place well after the images are captured, but the user must also type in the category information for every image during the categorization.

The present invention solves both problems by allowing the user to categorize images on the camera itself at the time of capture by recording category-specific voice annotations on the camera 12. The voice annotations, which are associated with the image, are then translated by voice recognition into text annotations, and the image and corresponding text annotations are automatically stored in the database 24 on the web site 15. The images are also indexed in the database 24 by the translated text annotations so that the images may be found more easily. An album 26, either web-based or printed, may automatically be generated from selected images in the database 24, where both the images 102 and the image's text annotations 28 are displayed.

FIG. 2 is a flow chart illustrating the process of automatically categorizing and storing digital images on a computer using a speech-based command language in a digital camera. The first step of the process is in response to capturing an image, storing the image in an image file that includes a format for storing image data, speech data, and text data in step 50.

Figure 3A:
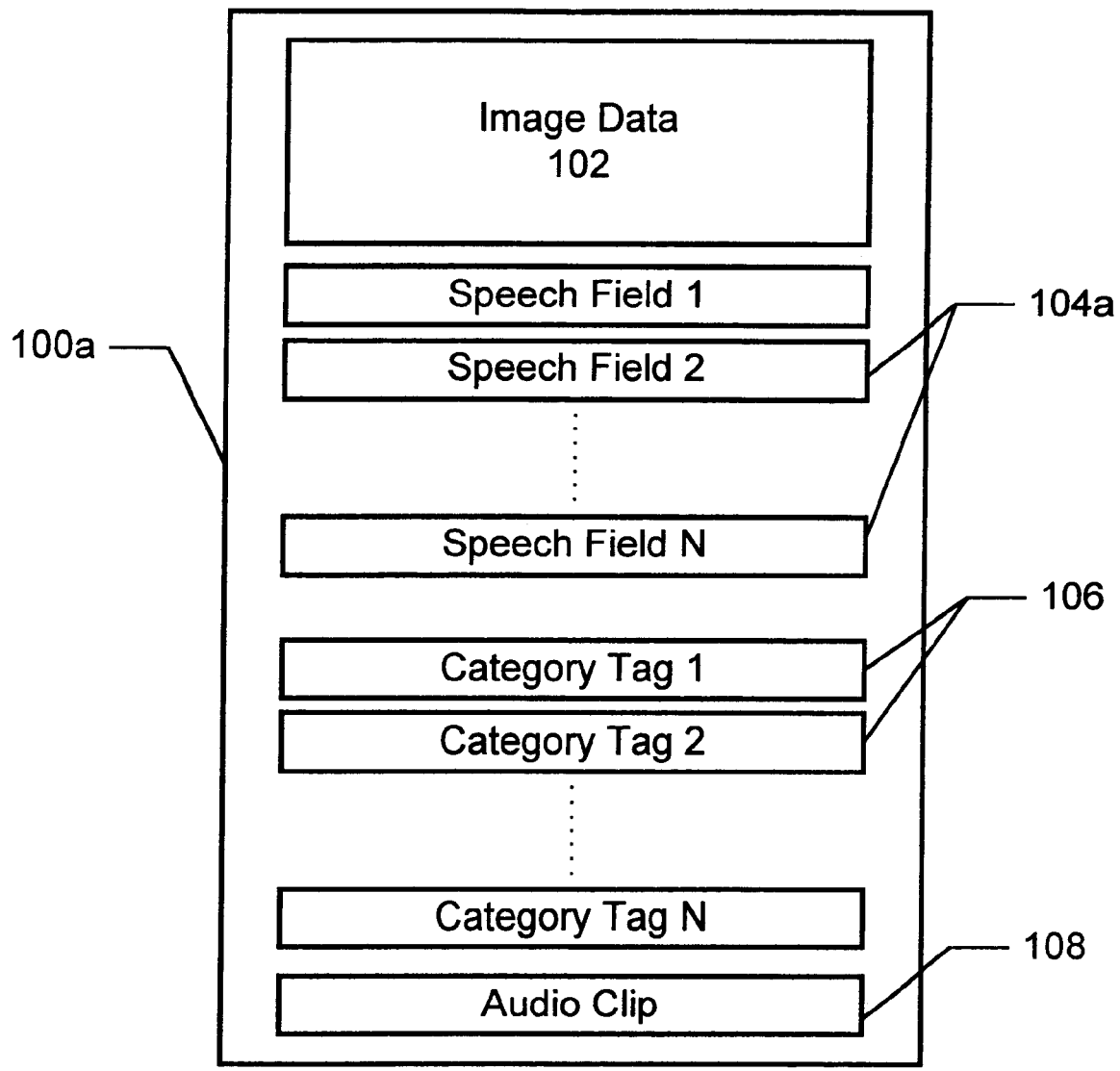
FIGS. 3A and 3B are block diagrams illustrating two image file formats in accordance with the present invention.

FIG. 3A shows one preferred embodiment of an image file 100 in accordance with the present invention. The image file 100a includes image data 102, multiple speech fields 104a, multiple text-based category tags 106, and an audio clip field 108. The image data 102 is the data comprising a captured image in compressed form, such as JPEG format. The speech fields 104a store the category voice annotations spoken by the user, and the textbased category tags 106 store text translations of those category voice annotations, as explained further below. The audio clip field 108 is for storing sound recorded for the image data 102, such as ambient audio recorded at the time of capture, a speech annotation, or music.

Figure 3B:
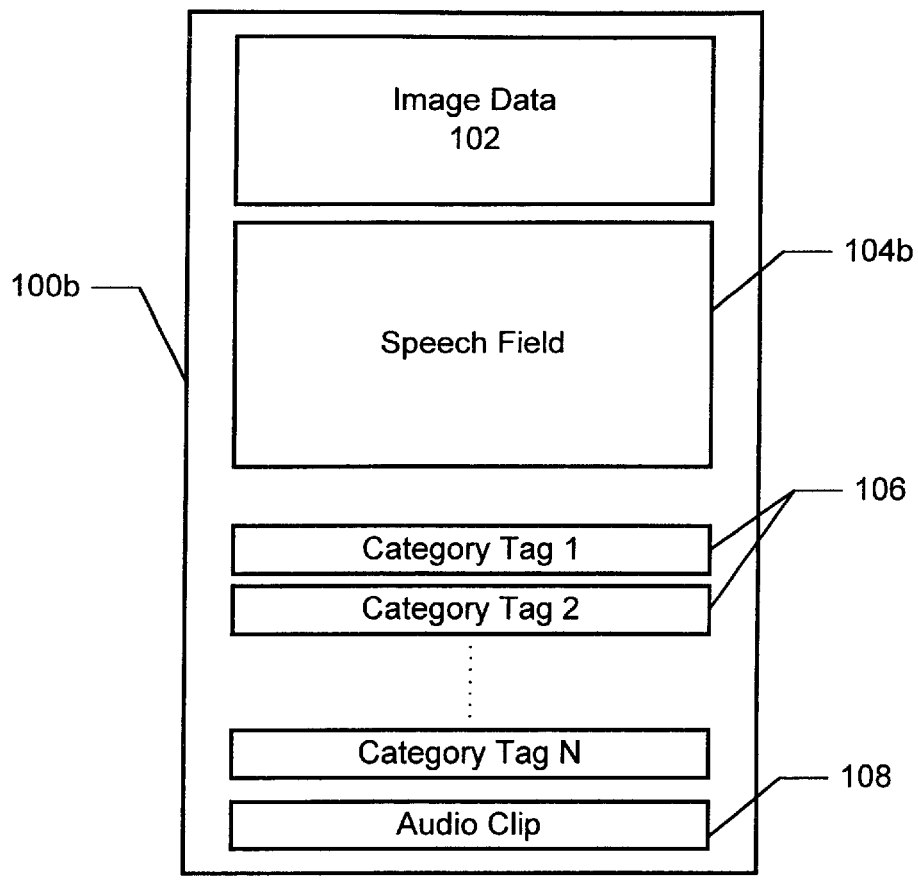

FIG. 3B shows a second preferred embodiment of an image file 100b, where the like components from FIG. 3A have like reference numerals. The format of image file 100b is similar to the format of image file 100a, except that the multiple speech fields are replaced with one large contiguous speech field 104b.

Referring again to FIG. 2, after an image is stored, a categorization process is initiated whereby the user speaks at least one category voice annotation for that image into the camera in step 52. According to the present invention, a speech-based command language is provided that enables the user to speak category information for multiple categories. The command language enables the server and/or the digital camera to associate the spoken information with a particular category.

Figure 4:
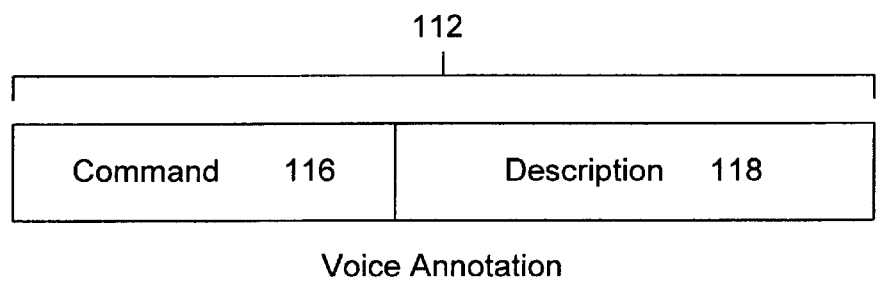
FIG. 4 is a block diagram illustrating the format of the speech-based command language in accordance with a preferred embodiment of the present invention.

FIG. 4 is a block diagram illustrating the format of the speech-based command language in accordance with a preferred embodiment of the present invention. The speech-based command language defines a voice annotation 112 as a command 116 identifying a particular category, which is followed by a description 118 within that category pertaining to the current image.

The command language may include a vocabulary to identify any number categories. Example command/categories include "Occasion", "Location", "Caption", "Destination", and "History", for instance. The "Occasion" category allows the user to speak the name of occasion or event during which the current image was captured. The "Location" category allows the user to speak a location of where the current image was captured. The "Caption" category allows the user to speak details about the image.

According to one aspect of the present invention, two command/categories, "Destination" and "History", are provided with functional characteristics. The "Destination" category allows the user to identify a destination or person (e.g., email address) to whom the current image is to be sent. The terms spoken for the "History" category are used by the server 16 to search a historical database 32 so that relevant articles may be retrieved and associated with the image.

Assume, for example, the user wishes to categorize an image taken at the Acropolis in Athens, Greece. The user might record the following voice annotations for this image:

"Occasion: vacation in Greece"

"Location: the Acropolis in Athens"

"Caption: the east side of the Parthenon"

"Destination: mom@home.com"

"History: Greek mythology"

The categorization process on the digital camera 12 using the speech-based command language may be implemented in a variety of ways. In a preferred embodiment, the categorization process may be automatically initiated immediately after image capture, or manually initiated by the user after a series of images have been taken.

In addition, the voice annotations 112 may be recorded individually or continuously in a series. A user may continuously record a voice annotation by pressing the audio button 22 to begin a recording session and speaking a voice command identifying a category (e.g., "Caption"), followed by a description; speaking a second voice command identifying another category (e.g., "Location") followed by a description, and so on for each category the user wishes to annotate. To help with this process, the camera 12 could display a sequence of prompts reminding the user to annotate particular categories. Rather than displaying a text prompt, the camera 12 could play a voice prompt requesting that the user speak a phrase for a particular category. For example, the camera could ask the user "In What Location Was This photo Taken?" In response, the user speaks a voice annotation, which is then recorded by the camera 12 under the "Location" category.

During this sequential recording, the user may need to pause to think about what they wished to record. Therefore, the user may also record each category voice annotation 112 individually in a series of discrete recording sessions. A user may individually record a voice annotation 112 by beginning and ending a recording session for each annotation 112. For example, the user may press the audio button 22 and speak "Caption" followed by a description, and then press the audio button 22 again to end the recording session. The user may then begin a second recording session by pressing the audio button 22 and speaking "Location", speaking a description, and then pressing the audio button 22 again to end the session.

Referring again to FIG. 2, after the voice annotations 112 are recorded, the voice annotations 112 are stored in the speech fields 104 of the image file 100 in step 54. In a preferred embodiment, if the voice annotations 112 are recorded individually, then each voice annotation 112 may be stored in the separate speech fields 104a of the image file 100a (FIG. 3A). If the voice annotations 112 are recorded as a continuous series, then the series of voice annotations 112 may be stored in the single speech field 104b of image file 100b (FIG. 3B). Although in a preferred embodiment, the voice annotations 112 are stored along with the image in an image file 100, the voice annotations may also be stored in a file separate from the image file 100.

After the user has finished categorizing images with voice annotations 112, the image files 100 are uploaded to the server 16 for processing and voice recognition in step 56.

In a preferred embodiment, the images are uploaded by either directly connecting the camera 12 to the Internet via a modem or wireless technology, or by uploading the images to a PC first and then uploading them to the server 16 over the Internet. In an alternative embodiment, the images may be uploaded to a local computer for processing, rather than a Web server. In this case, the images are transferred to the computer via serial, USB, IEEE 1394, wireless, or by inserting a memory card from the camera into a computer card slot.

During uploading process, the user preferably identifies him or herself with an account number, and requests a voice processing service to identify that the image files 100 have voice annotations that need translating. The user may also specify parameters controlling the processing, such as selecting a photo album format, a title for the photo album, and whether the photo album will include historical information from the "History" category, and so on. In a preferred embodiment, the title for the photo album, or album name, may be provided as one of the commands so that the user may speak an album name for each image.

After the image files 100 are received by the server 16, the image files 100 that the user has identified for voice recognition are processed by translating each of the voice annotations 112 in the image file 100 into a text annotation 28 in step 58.

A threshold test is then performed to determine whether the probability of translation accuracy for each image exceeds an acceptable threshold in step 60. In a preferred embodiment, the threshold test is performed by the server 16, and if the test fails, then a human operator attempts to manually correct any mistranslations in step 61. If the human operator cannot correct the mistakes, then the translation will fail the threshold test. The presence of the human operator may be an option chosen by the user, where electing not to have a human operator lowers the cost of the overall service.

If the translation fails the threshold test in step 60 and/or step 61, then the user is notified by e-mail or instant messenger and requested to correct the translations in step 62. The user may then correct the translations via reply e-mail or through the Web site in step 64.

Once the text annotations 28 pass the threshold test or are corrected, the text annotations 28 are stored in corresponding text-based category tags 106 within the image file 100 in step 66. Optionally, the voice annotations 112 may be deleted after being translated and stored in the category tags 106 to reduce storage requirements.

According to the present invention, if the "Destination" category has been translated, then the server 16 transmits the image data 102 to the specified location and/or recipient in step 68. The destination specified could be an e-mail address, a fax number, or a department name within a company, for instance.

According to another aspect of the present invention, the image data 102 and corresponding text annotations 28 are also stored in the database 24 in step 70. Preferably, the image data 102 and the text annotations 28 are saved under the name of the photo album specified by the user during the image upload process. In a preferred embodiment, the image file 100 is parsed, and the image data 102 is stored on a file server, while the text annotations are stored in a relational database. Also stored are the user's profile, a list of all the images uploaded by the user, the location of the images and the category tags, and the names of the photo albums to which they belong.

The voice annotation for the "Caption" category may be the same as the voice annotation entered for the "History" category (e.g., speaking "San Francisco" for both "Caption" and "History" for an image taken in San Francisco), or they may be different. The difference is that the words in the "History" category are used as keywords for searching the historical database 32. The historical information retrieved from the historical database 32 based on those keywords may then be stored in the database 24 with the corresponding image data 102 as a historical category tag in step 72.

After all the image files 100 have been processed and stored in the database 24, the user is notified in step 74. In response to the user visiting the website 15 and selecting a photo album name, all the images in the database 24 indexed under the album name are retrieved to dynamically create the album 26 in real-time in step 76. The server 16 automatically generates the necessary markup language (e.g., HTML and XML) and inserts all the images indexed under the album name from the database 24. The text annotations 28 from the category tags for each image are also inserted into the HTML. The HTML of the Web-based photo album 26 is then provided to be the user's Web browser. The user may also choose to have the album 26 printed as well.

In a second embodiment, the user may manually create the photo album 26 from selected images by visiting the Web site and entering keywords into a database search field. In response, all the images from the database 24 having matching keywords in the text annotations 28 are displayed on the photo album 26 along with their corresponding text annotations 28. For example, the user may log onto the website 15 and instruct the server 16 to create a photo album 26 comprising all images taken while at the "Beach" on "Vacation". The server 16 will then use those keywords and return to all the images in the database having matching keywords.

As described above, the preferred embodiment of the present invention takes advantage of the processing power of the server 16 to perform the voice recognition. In an alternative embodiment, however, if the digital camera 12 is provided with sufficient memory and processing power, then the voice recognition could be performed on the camera 12 to translate the voice annotations 112 into text. In this case, the server 16 would only need to store the image 102 and the category tags 106 in the database.

A method and system for automatically categorizing, storing, and presenting digital images has been disclosed. The present invention has been described in accordance with the embodiments shown, and one of ordinary skill in the art will readily recognize that there could be variations to the embodiments, and any variations are would be within the spirit and scope of the present invention. Accordingly, many modifications may be made by one of ordinary skill in the art without departing from the spirit and scope of the appended claims.

What is claimed is:

1. A method for automatically storing and presenting digital images, comprising the steps of:

(a) storing a digital image on a digital camera in an image file that includes at least one speech field and at least one text-based tag;

(b) initiating a categorization process whereby a user speaks at least one category voice annotation into the digital camera;

(c) storing the category voice annotation in the speech field of the image file;

(d) providing the digital camera with a voice recognition application and translating the category voice annotation into a text annotation on the digital camera using the voice recognition application;

(e) automatically storing the image and the text annotation in a database; and (f) dynamically creating an album by retrieving selected images and corresponding text annotations from the database in response to a request from the user, and by displaying each image on the album along with the text annotations.

2. A method for automatically storing and presenting digital images, comprising the steps of:

(a) storing a digital image on a digital camera in an image file that includes at least one speech field and at least one text-based tag;

(b) initiating a categorization process whereby a user speaks at least one category voice annotation into the digital camera;

(c) storing the category voice annotation in the speech field of the image file;

(d) translating the category voice annotation into at a text annotation using a voice recognition application and recognizing at least one voice command within the voice annotation, wherein the at least one voice command identifies a category;

(e) automatically storing the image and the text annotation in a database; and (f) dynamically creating an album by retrieving selected images and corresponding text annotations from the database in response to a request from the user, and by displaying each image on the album along with the text annotations.

3. The method of claim 2 wherein step (d) further includes the step of:

(iii) providing a destination voice command that identifies a location/recipient of where the voice annotation should be sent; and (iv) transmitting the image and the text annotation to the identified location/recipient.

4. The method of claim 3 wherein step (f) further includes the step of:

(i) retrieving the selected images based on the album name supplied by the user.

5. The method of claim 2 wherein step (d) further includes the step of:

(v) providing a history voice command; and (vi) using keywords from the text annotation to retrieve articles from a historical database.

6. The method of claim 5 wherein step (f) further includes the step of:

(ii) providing a web page to the user including the retrieved images and the text annotations.

7. The method of claim 5 wherein step (f) further includes the step of:

(ii) printing a photo album including the retrieved images and the text annotations.

8. A method for automatically storing and presenting digital images, comprising the steps of:

(a) receiving an image and a plurality of image tags associated with the image, wherein the plurality of image tags include voice annotations and at least one text-based image tag;

(b) translating the first plurality of voice annotations into a first plurality of text annotations;

(c) storing the image and the plurality of text annotations in a database, wherein the database includes previously stored images and corresponding text annotations; and (d) dynamically creating an album of a subset of images stored in the database by retrieving selected images and corresponding text annotations from the database in response to a database query from the user, wherein the database query identifies one or more selection criteria for the plurality of text annotations, and displaying each image on the album along with the text annotations that has corresponding text annotations satisfying the database query.

9. The method of claim 8 wherein step (a) further includes the step of:

(i) receiving a photo album name for the image.

10. The method of claim 9 wherein step (a) further includes the step of:

(ii) providing the plurality of voice annotations with at least one voice command identifying a category.

11. The method of claim 10 wherein step (b) further includes the step of: translating the plurality of voice annotations using a voice recognition application.

12. The method of claim 11 wherein step (b) further includes the step of:

(ii) recognizing the at least one voice command within the plurality of voice annotations; and (iii) storing the plurality of text annotations into the at least one text-based image tag.

13. The method of claim 12 wherein step (d) further includes the step of:

(i) retrieving the selected images based on the photo album name supplied by the user.

14. The method of claim 13 wherein step (f) further includes the step of:

(ii) providing a web page including the retrieved images and the text annotations.

15. The method of claim 13 wherein step (f) further includes the step of:

(ii) printing a photo album including the retrieved images and the plurality of text annotations.

16. A system for automatically storing and presenting digital images, comprising:

a server for receiving image files containing digital images from a user, wherein each image file includes a first plurality of speech fields and at least one text-based tag, wherein the speech fields store a second plurality of category voice annotations spoken by the user where the voice annotations categorize the respective digital image;

a voice recognition application for translating each of the category voice annotations stored in speech fields of the image files into text annotations;

a database for storing each image and the corresponding text annotation, wherein each image is indexed according to its text annotations; and album creation means for dynamically creating an album of a subset of the image files stored in the database in response to a user's database query, wherein the database query identifies one or more selection criteria, by retrieving selected images and corresponding text annotations from the database, wherein each image is displayed on the album along with the text annotations and wherein the displayed images have corresponding text annotations satisfying the database query.

17. The system of claim 16 wherein the text annotations are automatically stored in the at least one text-based tag in the image file.

18. The system of claim 17 wherein the server receives the image files and an album name to which the images are to be associated with.

19. The system of claim 18 wherein the server receives the image files directly from a digital camera.

20. The system of claim 19 wherein each category voice annotation comprises at least one voice command that identifies a category, followed by a description.

21. The system of claim 20 wherein a first voice command comprises a destination command that identifies a location/recipient, and the server transmits the image and the text annotation to the identified location/recipient.

22. The system of claim 20 wherein a second voice command comprises a history command, wherein words in the description are used to retrieve articles from a historical database.

23. The system of claim 16 wherein the album creation means retrieves the selected images based on the album name supplied by the user.

24. The system of claim 16 wherein the album creation means provides a web page to the user including the retrieved images and the text annotations.

25. The system of claim 16 wherein a category voice annotation comprises at least one voice command.

26. A method for processing digital images, comprising the steps of:
(a) storing a digital image on a digital camera in an image file that includes one or more speech fields and one or more text-based tags;
(b) initiating a categorization process whereby a user speaks a plurality of category voice annotations into the digital camera;
(c) storing the plurality of category voice annotations in the one or more speech fields of the image file;
(d) translating the plurality of category voice annotations into a plurality of text annotations; and
(e) automatically storing the image and the plurality of text annotations in a database using the plurality of text annotations as a plurality of database searchable fields to the digital image.

27. The method of claim 26 further comprising the step of:
(f) dynamically creating an album of a subset of image files stored in the database by retrieving one or more images from the database in response to a database query from the user, wherein the database query identifies one or more selection criterion using the database searchable fields and the retrieved one or more images having corresponding text annotations that satisfy the database query.

28. The method of claim 27 wherein step (f) further includes retrieving text annotations corresponding to the retrieved one or more images.

29. The method of claim 28 wherein step (f) further includes the step of:
(g) displaying the one or more images of the album and the corresponding one or more text annotations.

30. The method of claim 27 wherein step (f) further includes the step of:
(g) displaying the one or more images of the album.

31. The method of claim 26 wherein a text annotation includes a voice command and step (d) further comprises executing the voice command after it is translated.

32. The method of claim 31 wherein the voice command includes a destination voice command and the execution of the destination voice command results in transmittal of the digital image to a preselected destination.

33. The method of claim 32 wherein the destination voice command identifies a location/recipient and the preselected destination includes the location/recipient.

34. The method of claim 31 wherein the voice command includes an information voice command and the execution of the information voice command results in retrieval of preselected information.

35. The method of claim 34 wherein the information voice command includes a historical voice command.

36. The method of claim 35 wherein the preselected information includes historical information from a historical database.

* * * * *